(12) United States Patent
Davis (10) Patent No.: US 9,250,917 B2
(45) Date of Patent: *Feb. 2, 2016

(54) AUTO-CLOUDIFYING APPLICATIONS VIA RUNTIME MODIFICATIONS

(71) Applicant: International Business Machines Corporation, Armonk, NY (US)

(72) Inventor: Douglas Davis, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/492,314

(22) Filed: Sep. 22, 2014

(65) Prior Publication Data

US 2015/0067686 A1  Mar. 5, 2015

Related U.S. Application Data

(63) Continuation of application No. 14/010,952, filed on Aug. 27, 2013.

(51) Int. Cl.
| | | |
|---|---|---|
| *G06F 9/45* | (2006.01) | |
| *G06F 9/445* | (2006.01) | |
| *G06F 9/46* | (2006.01) | |
| *G06F 9/455* | (2006.01) | |
| *H04L 29/08* | (2006.01) | |
| *G06F 9/44* | (2006.01) | |

(52) U.S. Cl.
CPC .............. *G06F 9/44* (2013.01); *G06F 9/44521* (2013.01); *G06F 9/45516* (2013.01); *G06F 8/41* (2013.01); *G06F 9/445* (2013.01); *G06F 9/465* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 5,278,986 | A | * | 1/1994 | Jourdenais ................ G06F 8/45 712/23 |
| 6,341,368 | B1 | | 1/2002 | Deans |
| 6,363,433 | B1 | * | 3/2002 | Nakajima ............... G06F 9/445 719/313 |
| 7,000,006 | B1 | | 2/2006 | Chen |
| 7,174,370 | B1 | * | 2/2007 | Saini ...................... H04L 67/10 709/220 |
| 7,752,626 | B1 | * | 7/2010 | Pandey ................... G06F 9/465 709/203 |
| 8,127,282 | B2 | | 2/2012 | Slattery |
| 8,271,653 | B2 | | 9/2012 | DeHaan |
| 8,271,974 | B2 | | 9/2012 | Mazhar et al. |

(Continued)

OTHER PUBLICATIONS

Almorsy, M., et al., SMURF: Supporting Multi-tenancy Using Re-Aspects Framework, 17th International Conference on Engineering of Complex Computer Systems (ICECCS), Jul. 18-20, 2012, pp. 361-370, [retrieved on Jul. 23, 2015], Retrieved from the Internet: <URL:http://ieeexplore.ieee.org/>.*

(Continued)

*Primary Examiner* — Thuy Dao
*Assistant Examiner* — Geoffrey St Leger
(74) *Attorney, Agent, or Firm* — VanLeeuwen & VanLeeuwen (57) ABSTRACT

An approach is provided in which a distributed runtime environment executes a software application that includes isolated runtime constructs corresponding to an isolated runtime environment. During the execution, the distributed runtime environment identifies isolated runtime constructs included in the software application and selects distributed runtime constructs corresponding to the isolated runtime constructs. In turn, the distributed runtime environment executes the distributed runtime constructs in lieu of executing the isolated runtime constructs.

5 Claims, 8 Drawing Sheets

(56) References Cited

U.S. PATENT DOCUMENTS

| | | | |
|---|---|---|---|
| 2008/0172658 A1* | 7/2008 | Russell | G06F 9/45516 717/138 |
| 2009/0119651 A1 | 5/2009 | Slattery | |
| 2010/0306355 A1 | 12/2010 | Lagergren et al. | |
| 2012/0030672 A1 | 2/2012 | Zygmuntowicz et al. | |
| 2012/0096149 A1 | 4/2012 | Sunkara | |
| 2012/0239825 A1 | 9/2012 | Xia et al. | |
| 2013/0031158 A1 | 1/2013 | Salsburg et al. | |
| 2013/0086549 A1 | 4/2013 | Riehl et al. | |
| 2013/0091285 A1 | 4/2013 | Devarakonda et al. | |
| 2013/0091557 A1 | 4/2013 | Gurrapu | |
| 2014/0067864 A1 | 3/2014 | Holland et al. | |

OTHER PUBLICATIONS

Nugraheni, E., Migration of Web Application SIMA into Multi-tenant SaaS, International Conference on ICT for Smart Society (ICISS), Jun. 13-14, 201, pp. 1-4, [retrieved on Jul. 23, 2015], Retrieved from the Internet: <URL:http://ieeexplore. ieee.org/>.*

Ghosh, "An Approach To Seamlessly Cloudify User-Generated Content From Mobile Devices," Master's Thesis, Altoo University, Espoo, Finland, Aug. 25, 2011, 60 pages.

"SmartCloud—System and Method for Faster VM Provisioning Time Utilizing Peers," ip.com, disclosed anonymously, IPCOM000221313D, Sep. 2012, 5 pages.

Office Action for U.S. Appl. No. 14/010,952 (Davis, "Auto-Cloudifying Applications Via Runtime Modifications," filed Aug. 27, 2013), U.S. Patent and Trademark Office, mailed Nov. 17, 2014, 16 pages.

Final Office Action for U.S. Appl. No. 14/010,952 (Davis, "Auto-Cloudifying Applications Via Runtime Modifications," filed Aug. 27, 2013), U.S. Patent and Trademark Office, mailed Apr. 6, 2015, 14 pages.

Notice of Allowance for U.S. Appl. No. 14/010,952 (Davis, "Auto-Cloudifying Applications Via Runtime Modifications," filed Aug. 27, 2013), U.S. Patent and Trademark Office, mailed Aug. 3, 2015, 9 pages.

Almorsy et al., "SMURF: Supporting Multi-tenancy Using Re-Aspects Framework," 17th International Conference on Engineering of Complex Computer Systems (ICECCS), Paris, France, Jul. 2012, pp. 361-370.

Nugraheni, "Migration of Web Application SIMA into Multi-tenant SaaS," International Conference on ICT for Smart Society, Jakarta, Indonesia, Jun. 2013, 4 pages.

* cited by examiner

AUTO-CLOUDIFYING APPLICATIONS VIA RUNTIME MODIFICATIONS

BACKGROUND

The present disclosure relates to auto-cloudifying applications in a runtime environment. More particularly, the present disclosure relates to replacing isolated runtime constructs with distributed runtime constructs while executing software applications originally designed to execute in an isolated runtime environment.

Software developers design software applications according to computing environment constraints of a particular computer system. For example, a software developer may include runtime constructs such as global variables and local disk access commands in a software application intended for a computer system executing an isolated, single instance of the software application. The software developer, however, does include such runtime constructs in a software application intended for a distributed computing environment that invokes multiple software application instances. Cloud computing is a form of a distributed computing environment that stores information, such as programs and data, in a "cloud" that supports multiple users and multiple software application instances.

In some situations for simplicity purposes, a software developer may write a software application prototype based on single-instance constraints even though a distributed computing environment is the software application's final computing environment. In these situations, after the software developer debugs the software application, the software developer changes various runtime constructs for the software application to execute correctly in a distributed computing environment.

BRIEF SUMMARY

According to one embodiment of the present disclosure, an approach is provided in which distributed runtime environment executes a software application that includes isolated runtime constructs corresponding to an isolated runtime environment. During the execution, the distributed runtime environment identifies isolated runtime constructs included in the software application and selects distributed runtime constructs corresponding to the isolated runtime constructs. In turn, the distributed runtime environment executes the distributed runtime constructs in lieu of executing the isolated runtime constructs.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages (e.g., interpreted languages such as Ruby, PHP (PHP Hypertext Preprocessor), etc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

Figure 1:
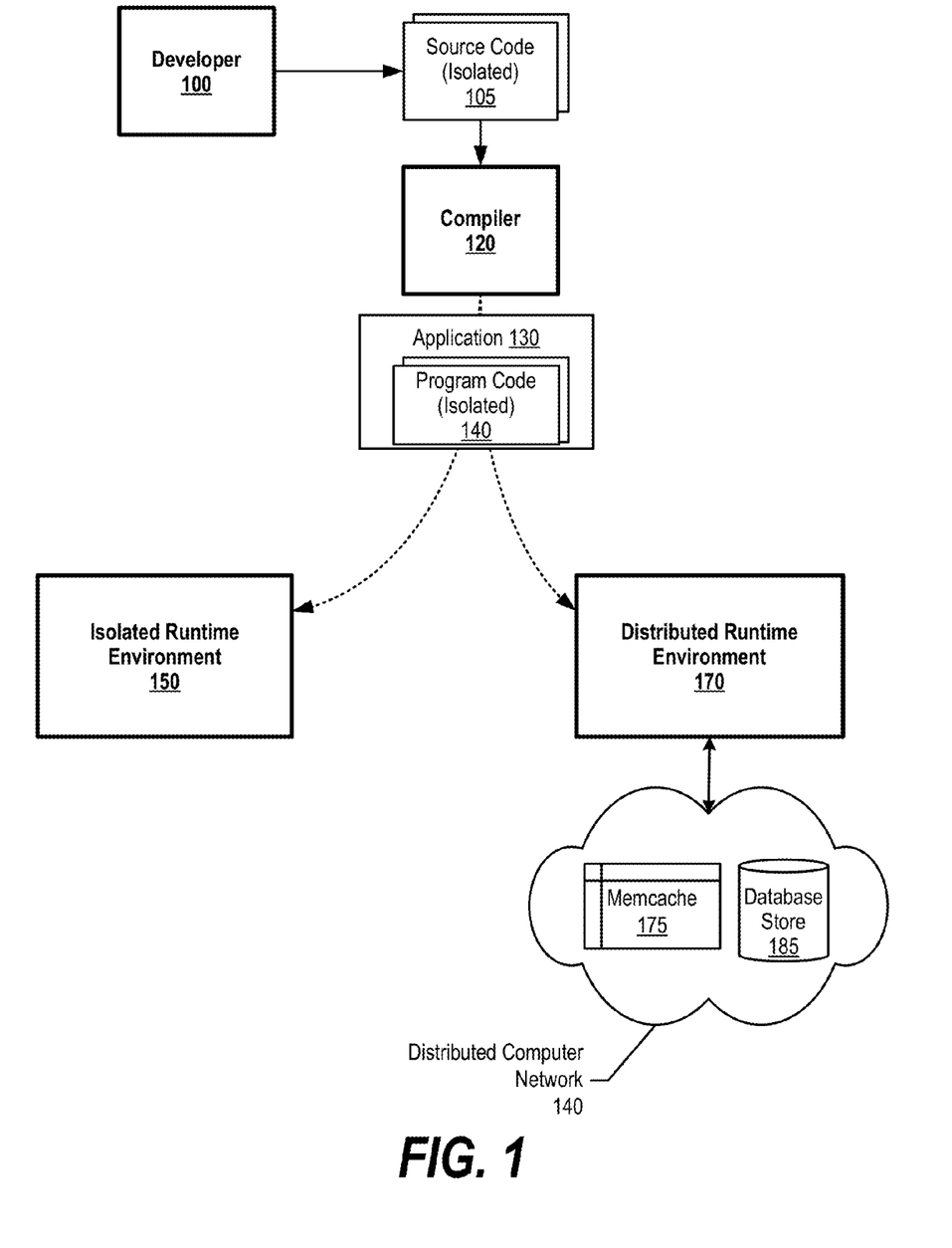
FIG. 1 is an exemplary diagram of a software developer generating a software application according to isolated runtime constraints and loading the software application onto an isolated runtime environment and a distributed runtime environment.

FIG. 1 is an exemplary diagram of a software developer generating a software application according to isolated runtime constraints and loading the software application onto an isolated runtime environment and a distributed runtime environment. This disclosure describes a distributed runtime environment that detects runtime constraints targeted for an isolated runtime environment, and executes distributed runtime constraints in lieu of the detected runtime constraints during execution. As such, a software developer may write a software program based on simplified, isolated runtime constraints and deploy the software program onto a distributed runtime environment.

As described herein, an isolated runtime environment executes on an isolated computing environment that is self-contained and executes software applications on a single-instance basis utilizing isolated runtime constructs such as those corresponding to non-local variables and local disk accesses. Non-local variables, as described herein, refers to data variables that are not scoped to a particular method or function, such as data stored in memory for the purpose of being available to subsequent process invocations (e.g., global variables). Also as described herein, a distributed runtime environment executes on a distributed computing environment that includes components located on networked computers, which communicate amongst each other by sending messages using mechanisms such as remote procedure calls and message queues. Cloud computing is a form of distributed computing that stores information, such as programs and data, in a "cloud" that is accessible to a network connected user.

Developer 100 creates source code 105, which developer 100 writes according to isolated runtime environment constraints (e.g., local disk runtime constructs, non-local runtime constructs, etc.). Compiler 120 compiles source code 105 to create application 130, which includes program code 140 targeted for isolated runtime environment 150. As such, isolated runtime environment 150 executes application 130 in a single instance, self-contained manner.

In addition to executing on isolated runtime environment 150, application 130 is also executable on distributed runtime environment 170 because, as discussed in greater detail below, distributed runtime environment 170 executes distributed runtime constructs during execution instead of isolated runtime constructs included in application 130. In turn, distributed runtime environment 170 may invoke multiple instances of application 130 on distributed computing network 140. In one embodiment, distributed runtime environment 170 uses memcache 175 and database store 185 to manage the multiple software application instances. As those skilled in the art can appreciate, memcache 175 is part of a general-purpose distributed memory caching system to increase dynamic database-driven accesses by caching data and objects in memory to reduce the number of times an external data source (such as a database or API) must be read. Database store 185 is, in one embodiment, a shared persistent storage that is accessed/shared by multiple clients and/or multiple application instances (see FIGS. 2, 6, and corresponding text for further details).

Figure 2:
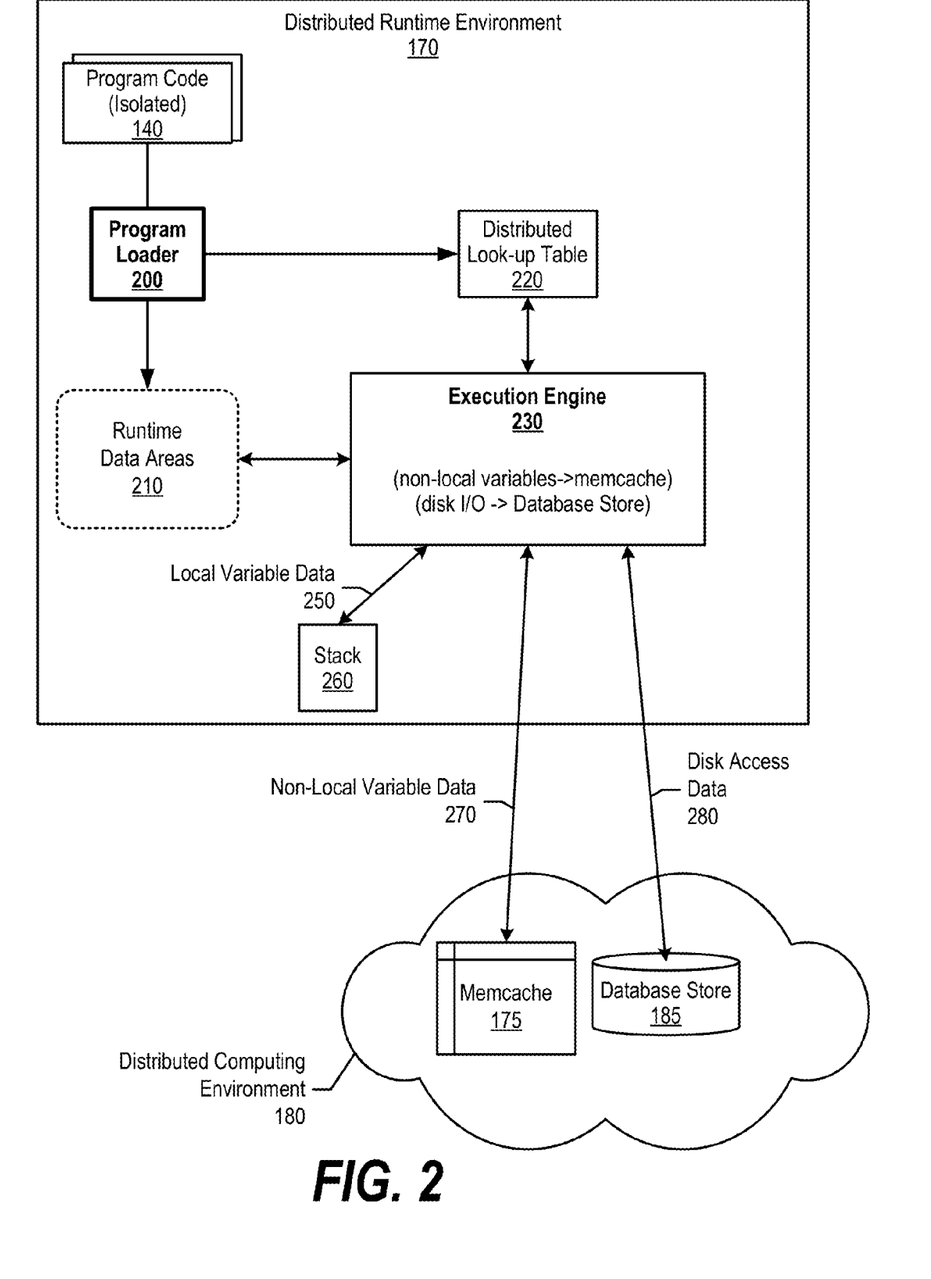
FIG. 2 is an exemplary diagram showing a distributed runtime environment loading and executing an isolated software application.

FIG. 2 is an exemplary diagram showing a distributed runtime environment loading and executing an isolated software application. The example shown in FIG. 2 corresponds to a Java runtime environment, but those skilled in the art understand that other runtime environments are capable of performing similar functions as discussed herein. In a Java-based environment, distributed runtime environment 170 includes a class loader subsystem (program loader 200) and execution engine 230. Program loader 200 loads class files (program code 140) into runtime data areas 210, and execution engine 230 executes instructions included in runtime data areas 210 accordingly. In addition, program loader 200 loads a distributed class library (distributed look-up table 220) onto distributed runtime environment 170.

Execution engine 230 commences execution and retrieves instructions (e.g., Java byte code) from runtime data areas 210. For each instruction, execution engine 230 determines whether the instruction includes an isolated runtime construct, such as a local disk runtime construct or a non-local variable runtime construct (see FIGS. 3-4 and corresponding text for further details). When execution engine 230 determines that the instruction includes an isolated runtime construct, execution engine 230 replaces the isolated runtime construct with a corresponding distributed runtime construct to execute (e.g., selects a distributed runtime construct to execute instead of the isolated runtime construct). For example, execution engine 230 executes corresponding distributed variable runtime constructs instead of non-local variable runtime constructs, and executes distributed database runtime constructs instead of local disk runtime constructs.

Execution engine 230 executes the distributed runtime constructs and, as such, sends/receives non-local variable data 270 to/from memcache 175, and sends/receives disk access data 280 to/from database store 185, which are both located in distributed computing environment 180.

When execution engine 230 determines that an instruction corresponds to a runtime construct that is not specific to an isolated runtime environment, such as a local variable runtime construct, execution engine 230 executes the instruction as is. FIG. 2 shows that execution engine 230 sends/receives local variable data 250 to/from stack 260.

Figure 3:
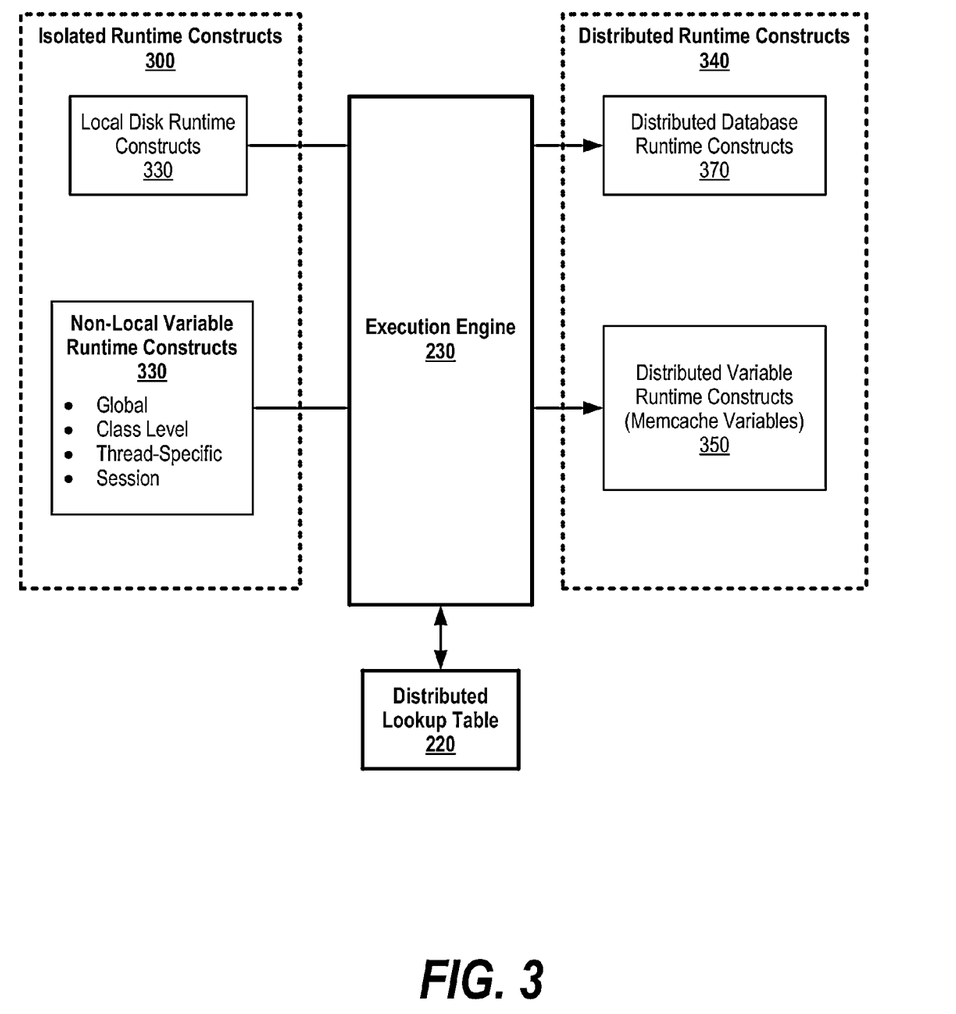
FIG. 3 is an exemplary diagram showing an execution engine selecting distributed runtime constructs to execute in lieu of isolated runtime constructs.

FIG. 3 is an exemplary diagram showing execution engine identifying distributed runtime constructs that correspond with isolated runtime constructs. A software application targeted towards an isolated runtime environment includes isolated runtime constructs 300 based upon isolated runtime constraints such as local memory availability and a single instance of the software application.

FIG. 3 shows an embodiment where isolated runtime constructs 300 include local disk runtime constructs 330 and non-local variable runtime constructs 320. Local disk runtime constructs 330 include constructs to read from or write to a local disk area (see FIG. 4A and corresponding text for further details). Non-local variable runtime constructs 330 include constructs that include global variables; class level variables, thread-specific variables, session variables, and any other type of variable that a software application utilizes on the assumption of a single application instance (see FIG. 4B and corresponding text for further details).

When execution engine 230 detects an instruction that includes a local disk runtime construct, execution engine accesses distributed lookup table 200 (e.g., a Java class library) to identify a corresponding distributed database access runtime constraint (e.g. accessing a blob data type in a persistent data store). In turn, execution engine 230 utilizes the distributed database access runtime construct to access a distributed database (database store 185) in a distributed computing environment.

When execution engine 230 detects an instruction that includes a non-local variable runtime construct, execution engine 230 identifies a distributed variable runtime constraint corresponding to the non-local variable runtime constraint. For example, execution engine 230 may replace local variable accesses to execute with memcache accesses backed by a shared remote persistent store. In turn, execution engine 230 utilizes the distributed variable runtime construct to send/receive data to/from a shared memory area (e.g., memcache 175) in a distributed computing environment.

Figure 4A:
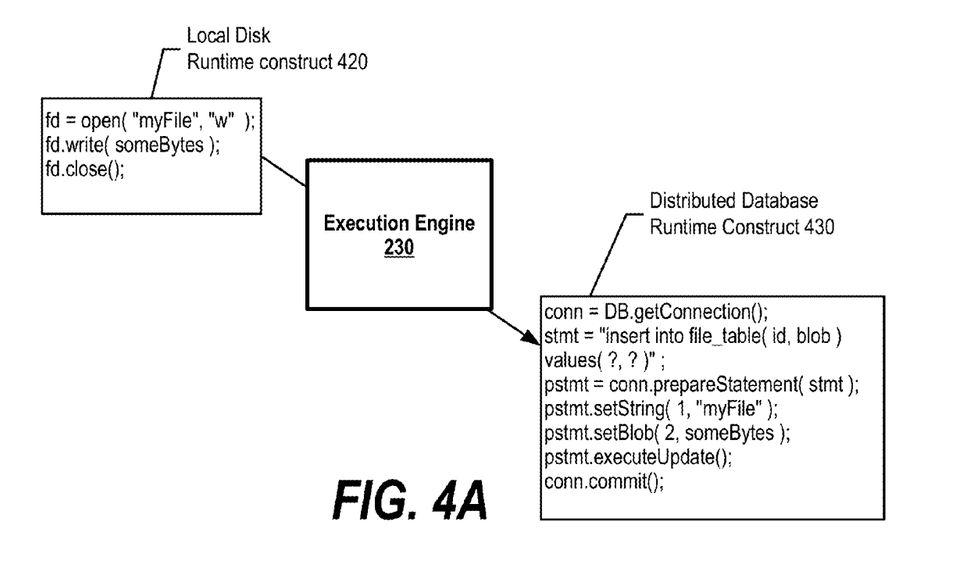
FIG. 4A is an exemplary diagram showing an execution engine selecting a distributed database runtime construct to execute in lieu of a local disk runtime construct.

FIG. 4A is an exemplary diagram showing an execution engine replacing execution of a local disk runtime construct with a distributed database runtime construct. Local disk runtime construct 420 writes data to a local storage area. Execution engine 230 detects the local disk operation and generates distributed database runtime construct 430. As can be seen, distributed database runtime construct 430 writes the data into a database table where the ID is the file name. In one embodiment, execution engine 230 generates distributed database runtime construct 430 by using the filename as the unique key (look-up value) in a remote persistent data store where the 'value' for the entry is a blob that persists the data normally residing in a file created by the application.

Figure 4B:
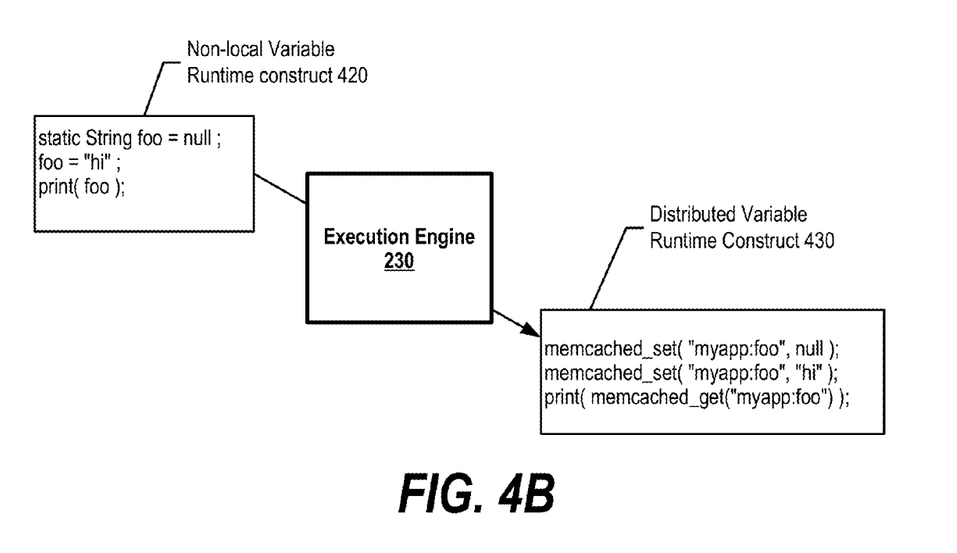
FIG. 4B is an exemplary diagram showing an execution engine selecting a distributed variable runtime construct to execute in lieu of a non-local variable runtime construct.

FIG. 4B is an exemplary diagram showing an execution engine replacing execution of a non-local variable runtime construct with a distributed variable runtime construct. Non-local variable runtime construct 420 includes a static variable "foo." As such, execution engine executes distributed runtime construct 430 in lieu of non-local variable runtime construct 420. As can be seen, distributed runtime construct 430 includes instructions corresponding to a memcache location that operates in a distributed, multi-instance environment. In turn, execution engine 230 uses distributed variable runtime construct 430 to access memcache 175.

Figure 5:
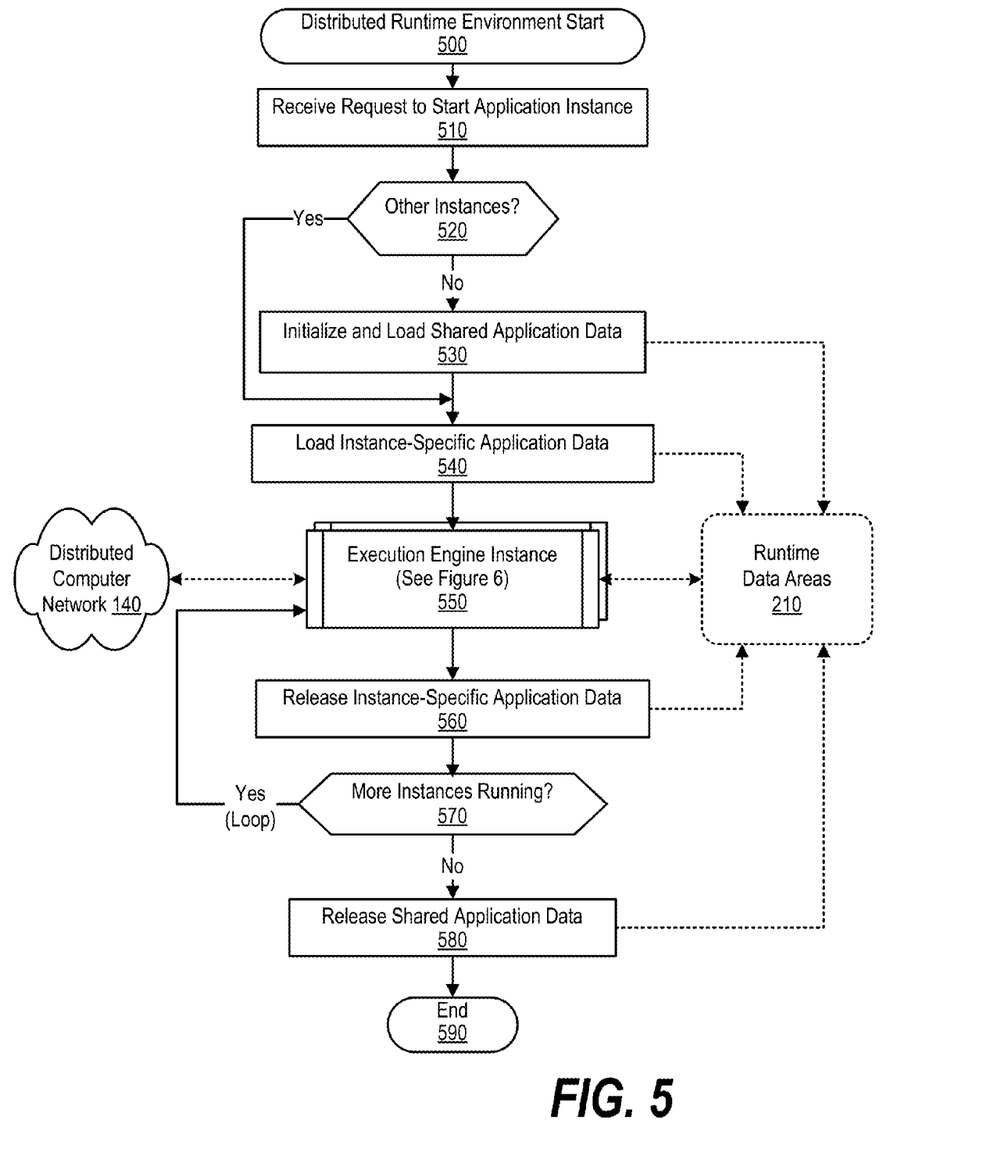
FIG. 5 is an exemplary flowchart showing steps taken in a distributed runtime environment executing a software application designed for an isolated runtime environment.

FIG. 5 is an exemplary flowchart showing steps taken in a distributed runtime environment executing a software application designed for an isolated runtime environment. Distributed runtime environment processing commences at 500, whereupon the distributed runtime environment receives a request to start an application instance, such as from a user or another software application (step 510).

The distributed runtime environment determines whether an instance of the software application is currently executing (decision 520). For example, in a Java-based runtime environment, a class loader loads shared files onto runtime data areas 210 the first time that a software application instance executes, which each subsequent software application instance shares. If the distributed runtime environment determines that a software application instance is not currently executing, decision 520 branches to the "No" branch, whereupon the distributed runtime environment initializes and loads shared application data (e.g., shared libraries) in the distributed runtime environment's runtime data areas 210 (step 530). On the other hand, if the distributed runtime environment determines that one or more instances of the software application are currently executing, decision 520 branches to the "Yes" branch, bypassing shared application data loading steps.

At step 540, the distributed runtime environment loads instance-specific application data in runtime data areas 210 for the newly requested instance. The distributed runtime environment invokes an instance of the distributed runtime environment's execution engine to execute the newly requested software application instance on distributed computer network 140 (pre-defined process block 550, see FIG. 6 and corresponding text for further details). As discussed in further detail below, the execution engine instance executes distributed runtime constructs in lieu of isolated runtime constructs as required.

When an execution engine instance terminates, the distributed runtime environment release the execution engine's instance-specific application data at step 560. The distributed runtime environment determines if other software application instances are executing (decision 570). If more instances are running, decision 570 branches to the "Yes" branch, which loops back to manage the execution engine instances. This looping continues until no more instances are running, at which point decision 570 branches to the "No" branch whereupon the distributed runtime environment releases shared application data stored in runtime data areas 210 (step 580), and ends software application processing at 590.

Figure 6:
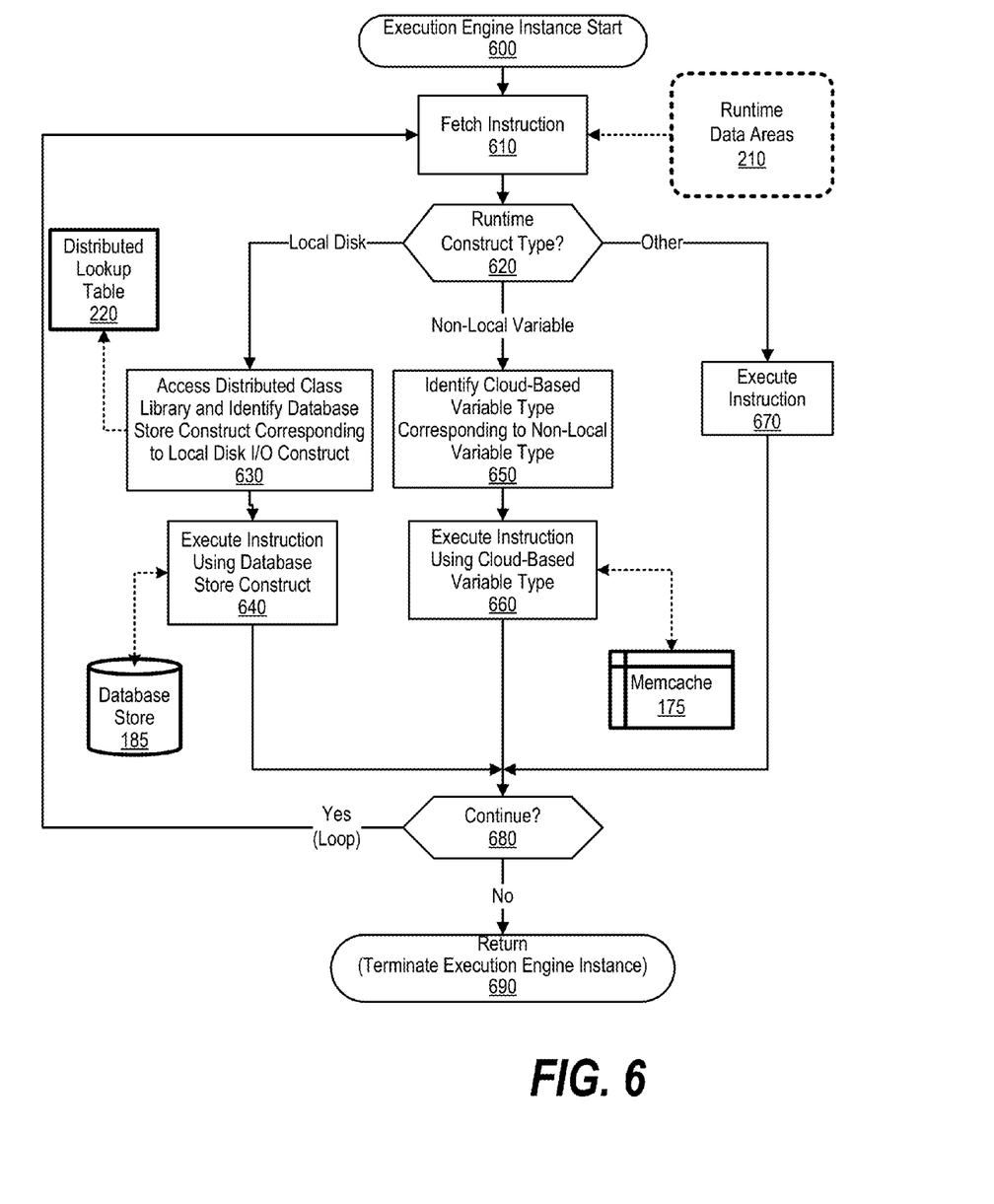
FIG. 6 is an exemplary flowchart showing steps taken in a distributed runtime environment's execution engine instance executing a software application that includes isolated runtime constructs.

FIG. 6 is an exemplary flowchart showing steps taken in a distributed runtime environment's execution engine instance executing a software application that includes isolated runtime constructs. The steps shown in FIG. 6 correspond to executing Java code but, as those skilled in the art can appreciate, similar steps are be performed in different runtime environments to execute distributed runtime constructs in lieu of isolated runtime constructs.

Processing commences at 600, whereupon the execution engine fetches an instruction (byte code) from runtime data areas 210 (step 610), and determines the runtime construct type of the instruction (decision 620). In one embodiment, the execution engine determines the instruction type by intercepting the request to access I/O runtime routines.

When the instruction type is a local disk runtime construct (e.g., File open, read, write, etc.), decision 620 branches the "Local Disk" branch, whereupon the execution engine accesses distributed lookup table 220 to retrieve a distributed database runtime construct corresponding to the local disk runtime construct (step 630, see FIG. 4A and corresponding text for further details). At step 640, the execution engine executes the instruction using the distributed database runtime construct, which loads/stores data from/to database store 185.

Referring back to decision 620, when the runtime construct is a non-local variable runtime construct, such as one that includes a global variable, decision 620 branches the "Non-Local Variable" branch, whereupon the execution engine identifies a distributed variable runtime construct corresponding to the non-local variable runtime construct (step 650, see FIG. 4B and corresponding text for further details). At step 660, the execution engine executes the instruction using the distributed variable runtime construct, which loads/stores data from/to memcache 175.

Referring back to decision 620, when the runtime construct is different than a local disk runtime construct or a non-local variable runtime construct, decision 620 branches to the "Other" branch, whereupon the execution instance executes the instruction as designed (step 670).

The execution engine determines whether to continue to execute the application instance (decision 680). If the execution engine should continue execution, decision 680 branches to the "Yes" branch, whereupon the execution engine instance retrieves and processes another instruction. This looping continues until the execution engine instance should terminate, at which point decision 680 branches to the "No" branch, whereupon processing returns at step 690.

Figure 7:
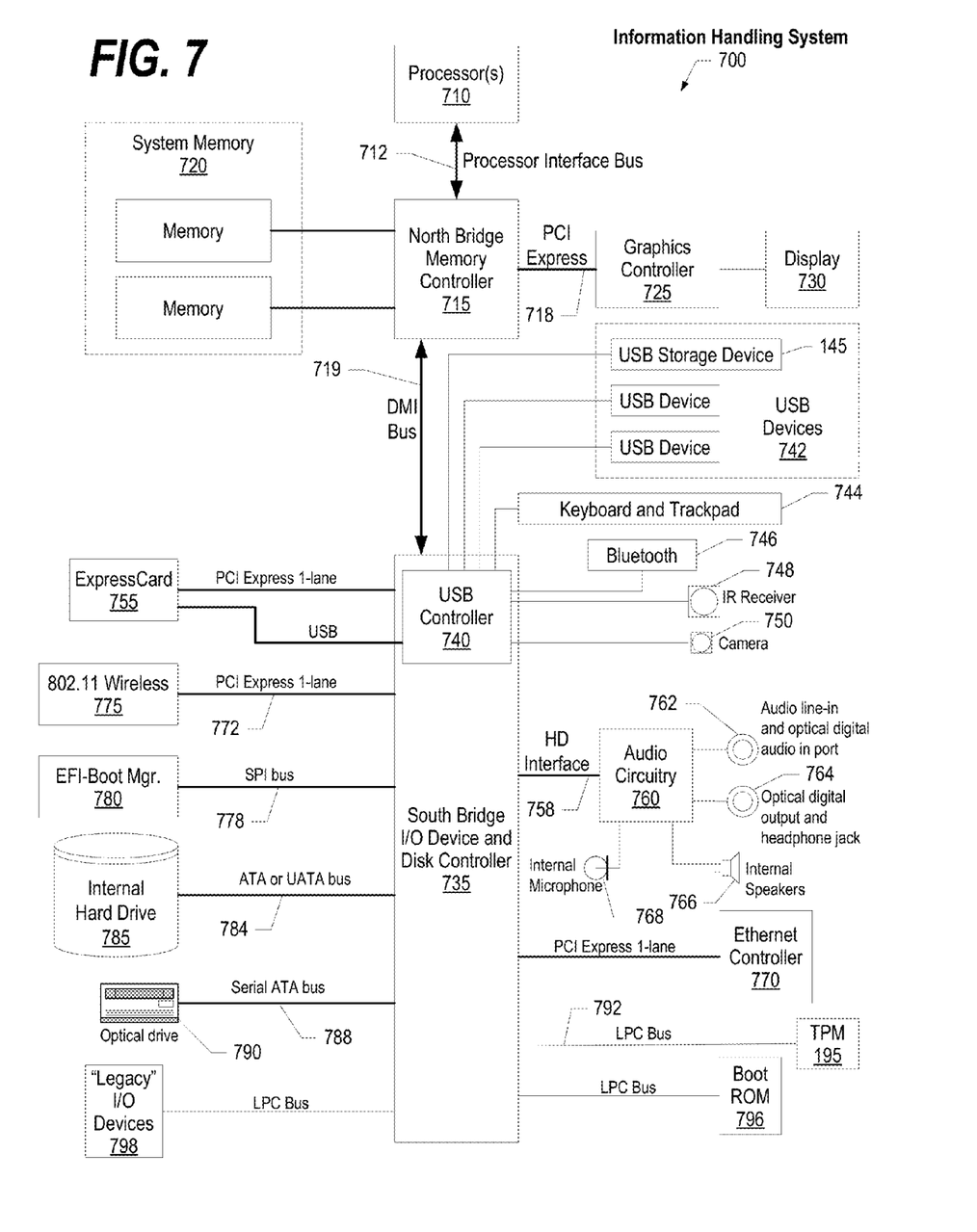
FIG. 7 is a block diagram of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 795) shown in FIG. 7 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 8.

Figure 8:
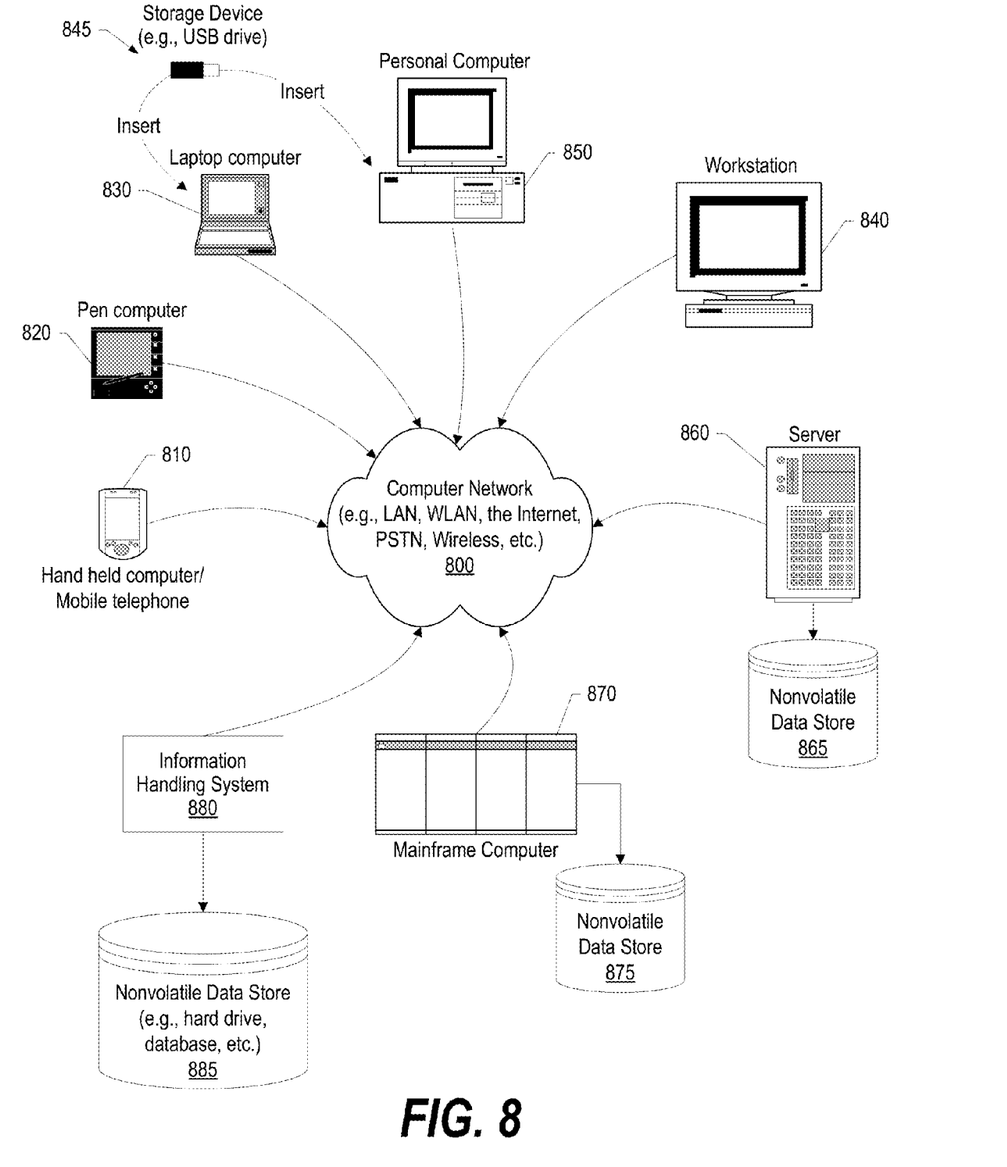
FIG. 8 provides an extension of the information handling system environment shown in FIG. 7 to illustrate that the methods described herein can be performed on a wide variety of information handling systems which operate in a networked environment.

FIG. 8 provides an extension of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   executing a software application, by at least one or more processors, in a distributed runtime environment, wherein the software application is program code configured to execute in an isolated runtime environment and includes one or more isolated runtime constructs corresponding to the isolated runtime environment, the executing further comprising:

determining a construct type of a selected one of the one or more isolated runtime constructs;

in response to determining that the selected isolated runtime construct is a non-local variable runtime construct:

selecting a distributed variable runtime construct that corresponds to the non-local variable runtime construct; and executing the selected distributed variable runtime construct in the distributed runtime environment in lieu of executing the non-local variable runtime construct; and in response to determining that the selected isolated runtime construct is a local data access runtime construct:

identifying a distributed data access runtime construct that corresponds to the local data access runtime construct; and sending a message to a distributed database using the distributed data access runtime construct in lieu of executing the local data access runtime construct.

2. The method of claim 1 wherein the one or more isolated runtime constructs are based upon executing a single software application instance of the software application, the method further comprising:

executing, in the distributed runtime environment, a plurality of software application instances corresponding to the software application utilizing the distributed variable runtime construct.

3. The method of claim 1 further comprising:

sending a message to a shared persistent storage area corresponding to the distributed runtime environment using the distributed variable runtime construct in lieu of executing the non-local variable runtime construct.

4. The method of claim 3 wherein the non-local variable runtime construct is selected from the group consisting of a global variable, a class level variable, a thread-specific variable, and a session variable.

5. The method of claim 1 wherein:

the isolated runtime environment executes on an isolated computing environment that is self-contained and executes the software application on a single-instance basis utilizing at least the non-local variable runtime construct and one or more local memory areas; and the distributed runtime environment executes on a distributed computing environment, the distributed computing environment including a plurality of components located on a plurality of networked computers that exchange one or more messages to coordinate one or more actions.

* * * * *